UNITED STATES PATENT OFFICE.

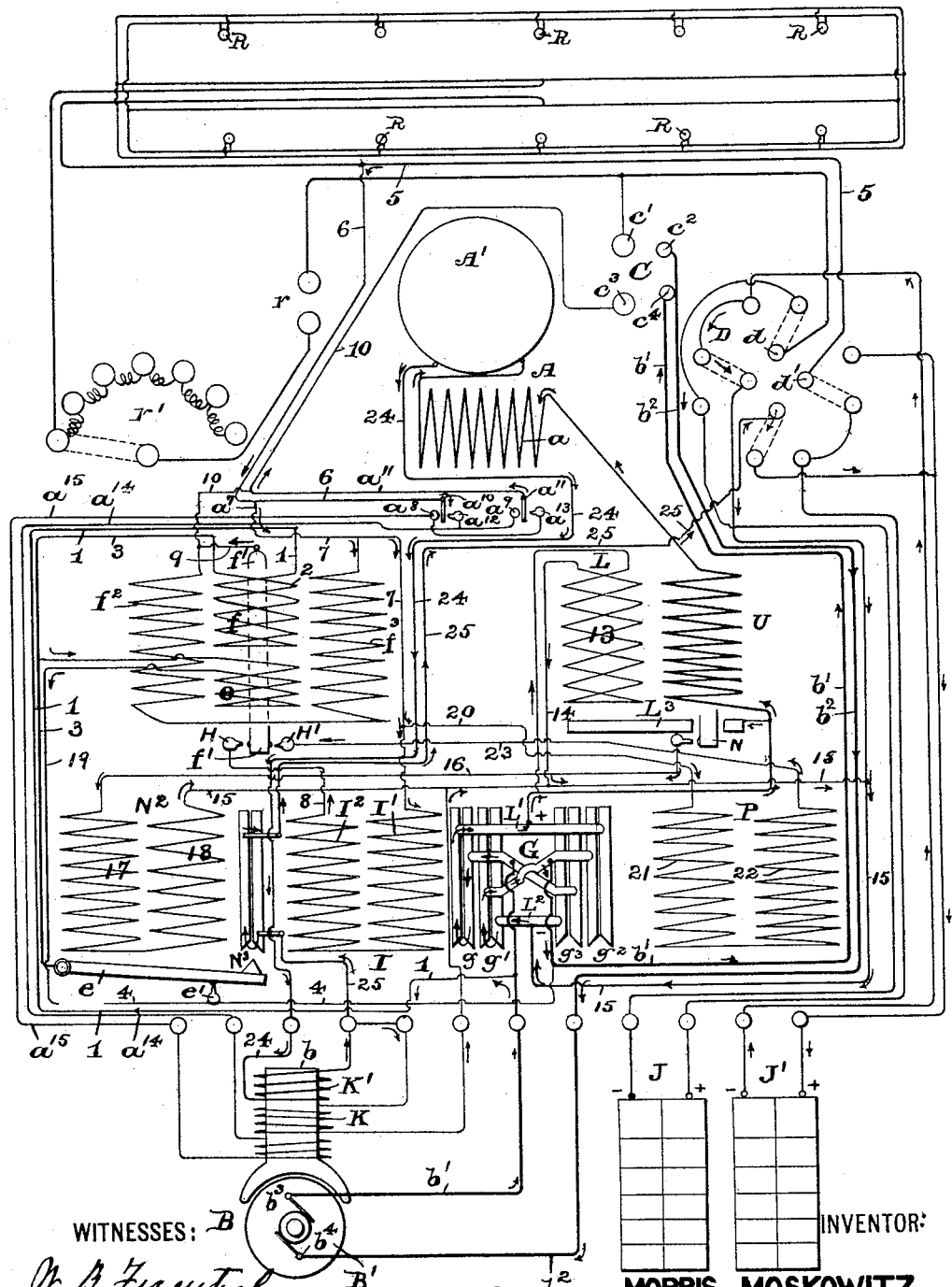

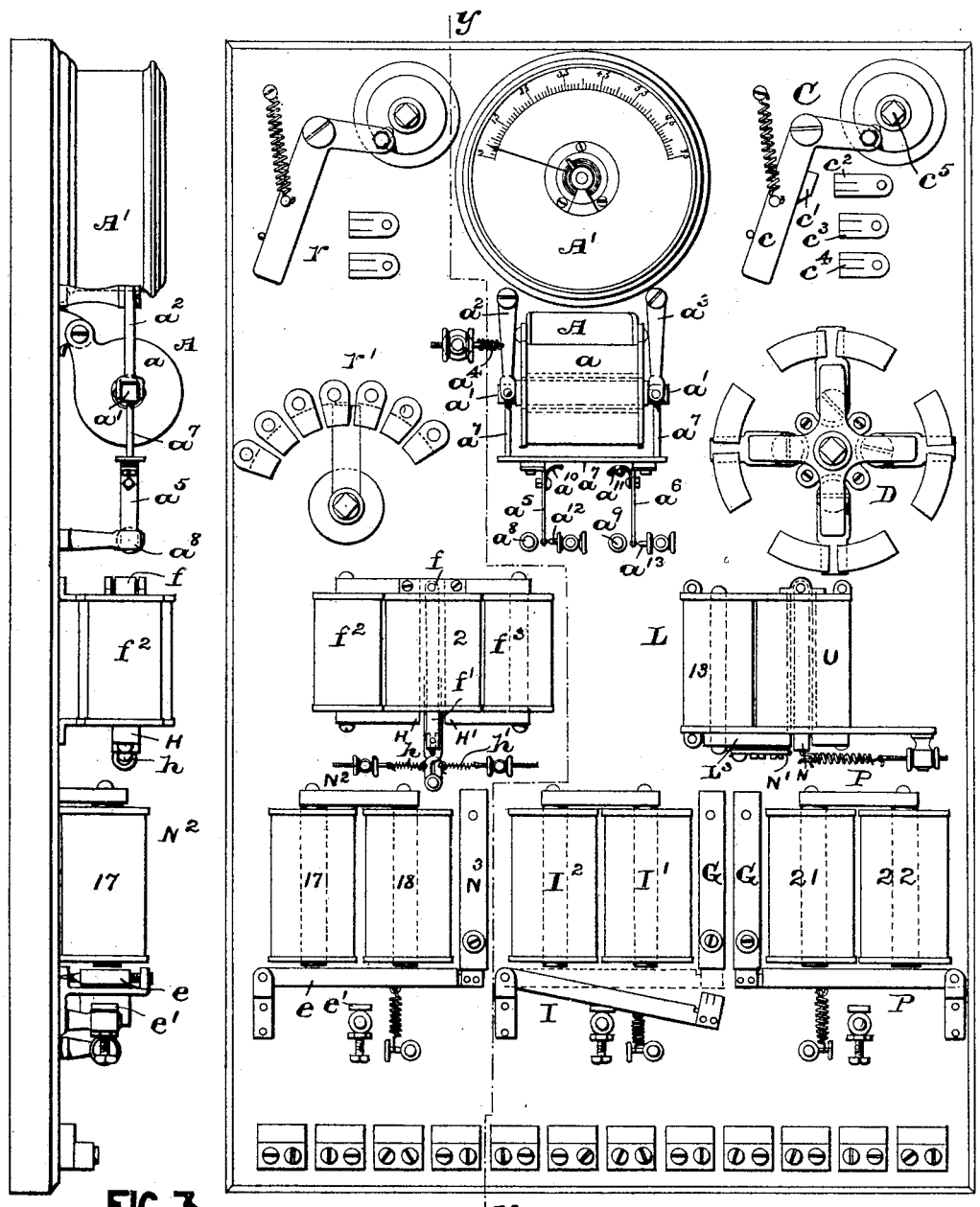

MORRIS MOSKOWITZ, OF NEWARK, NEW JERSEY, ASSIGNOR TO THE NATIONAL ELECTRIC CAR LIGHTING COMPANY, OF WEST VIRGINIA.

MEANS FOR GENERATING ELECTRICITY FROM CAR-WHEEL AXLES.

SPECIFICATION forming part of Letters Patent No. 595,329, dated December 14, 1897.

Application filed May 17, 1897. Serial No. 636,878. (No model.)

*To all whom it may concern:*

Be it known that I, MORRIS MOSKOWITZ, a citizen of the United States, residing at Newark, in the county of Essex and State of New Jersey, have invented certain new and useful Improvements in Means for Generating Electricity from Car-Wheel Axles; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My present invention relates to a novel and complete system of car or train lighting, heating, &c., where electricity is employed as the lighting or heating agent, and is designed for use with a dynamo or dynamos placed upon the truck carrying the car, the car-wheel axle being the source of power for driving the dynamo and the rotating dynamo-shaft being subject to reversal and also subject to varying speed, according to the direction of car travel and the different speeds thereof, the car-wheel axle forming the dynamo-shaft or the dynamo being driven from the car-wheel axle in the manner of my previous United States patent, No. 577,872, granted March 2, 1897, or in any other well-known manner.

The invention is therefore designed to provide a simple, complete, and effectively-operating system, having a dynamo in said system operated from a car-wheel axle, from which a constant output is derived irrespective of the axle speed, and in which system two sets of storage batteries are to be used, which act alternately when required, one set of batteries feeding the lamps or other electric devices in the lamp-circuit while the other set of batteries is being stored with electricity.

One manner of rendering the batteries active and useful for train-lighting purposes is illustrated and described in my previous Letters Patent, No. 542,771, granted July 16, 1895, the use and operation of the batteries in the present application being similar.

The main feature of my present invention is the use in the electrical system, for the purposes hereinabove stated, of an electric regulator (not shown or claimed in any of my previous Letters Patent) through the coils of which the whole external load of the dynamo passes, the armature of said regulator being made to act against a predetermined tension of a spring to produce a mechanical movement which will act, first, to break a small or weak circuit which has been used to draw current from one of the batteries in the system for the purpose of energizing the dynamo when the dynamo begins to start, so that there may be no question about the dynamo-field being built up, and to provide for a strong field, electrically, when the speed of the dynamo is slow, due to the slow motion of the car, and, secondly, to establish a stronger circuit through which the current will flow around the field of the dynamo in an opposite direction to the normal flow of current in order that the proper amount of current which is to be sent into and through the batteries can be automatically controlled and regulated to a predetermined amount.

It is well known that in a so-called "self-regulating" dynamo subject to variable speeds the electromotive force will rise a little as the speed increases. This slight increase of pressure or voltage will at times be the cause of too much current being sent through the batteries, and thereby greatly reduce the life of the batteries, and to such an extent that this method and system of generating electricity from a dynamo subject to variable speeds is not practical without some means of automatically regulating the electric output of the dynamo. The electric regulating device hereinabove mentioned is designed to overcome this difficulty.

This invention therefore consists in the employment of a self-regulating dynamo such as is illustrated in my previous Letters Patent, No. 542,487, of July 9, 1895, with a main exciting shunt-coil, a series coil wound in the opposite direction, and a high-resistance shunt-coil also wound in the opposite direction, in connection with such electric regulating device properly in circuit with the dynamo, in combination with the main or working circuit containing the lamps or other translating devices and a storage battery or batteries in said main circuit.

The invention consists, furthermore, in the arrangement of a dynamo such as has been hereinabove set forth and the electric regulating device above mentioned in combination with the main circuit containing the lamps or other translating devices, a pair of storage batteries in said main circuit connected with a switch, whereby one battery is directly connected in circuit with the main dynamo and is being charged thereby, while the other battery is disconnected with the dynamo and is directly in the lamp-circuit, and also an automatic pole-changer in circuit with said dynamo, whereby provision is made for the reversal of rotation of the armature in the dynamo when the car reverses its direction of travel.

The invention finally consists in the origination of the complete electrical systems of apparatus and circuits to be hereinafter fully described, and finally embodied in the clauses of the claim.

The invention is illustrated in the accompanying sheets of drawings, in which—

Figure 1 is a diagrammatic view clearly illustrating the arrangement of all the electrical circuits and apparatus therein. Fig. 2 is a face view of a board containing all the electrical apparatus employed in the system except the dynamo, batteries, lamps, and such other electric translating devices as may be desired for use in the lamp-circuit; and Fig. 3 is a side view of said board and the apparatus thereon, but only illustrating the apparatus at the right of the line $y$ drawn in said Fig. 2, the apparatus to the left of said line $y$ having been omitted.

In said drawings, B indicates the dynamo, which is subject to variable speed and to reversal of its armature-shaft. The dynamo, being provided with the three independent field-windings hereinabove stated, differs slightly from the dynamo shown in my previous patent, No. 542,487, in that the high-resistance shunt-winding in the present instance allows the current to flow through the field of the dynamo in the same direction as the current passing through the regular shunt-winding, conveying the current direct from the battery for the purpose of energizing the dynamo at the beginning of the armature rotation in order that its field may be built up and also to strengthen the field of the dynamo when the car is running very slowly. When, however, the speed of the dynamo-armature increases, which causes the current developed to exceed a certain or predetermined amount of current, then the said regulator hereinabove mentioned is suddenly actuated by the current flowing through its coils, and its plunger is thus drawn farther into the coil of said device against the tension of the spring with which it is operatively connected. This action causes the circuit to become broken, and in consequence weakens the dynamo-field, whereby the dynamo will develop less current, even though the armature speed is increased, as the speed of the train becomes greater. When the armature speed of the dynamo increases to a still greater speed, the plunger of said device is drawn still farther into the coil or solenoid and then makes contact with a second contact, whereby the battery-circuit is again cut in circuit with the dynamo-field, but causes the current generated to pass through said field in the opposite direction, which then causes the dynamo to operate in the manner of the dynamo set forth in my said previous patent, No. 542,487. The construction of said regulating device is clearly illustrated in Figs. 2 and 3. In said drawings it is indicated by the reference-letter A. Said device comprises a suitable coil $a$, adapted to be energized in the manner hereinafter set forth. Movably arranged in said coil $a$ is a metallic plunger $a'$, pivotally attached at its ends to two pivoted arms $a^2$ and $a^3$, one of which, as $a^2$, is connected with an adjustable tension-spring $a^4$, which acts in the usual and well-known manner to normally draw the contact-arms $a^5$ and $a^6$, connected with said plunger $a'$ by a frame $a^7$, against the contacts $a^8$ and $a^9$. The said contact-arms $a^5$ and $a^6$ are connected at $a^{10}$ and $a^{11}$ in the circuit running to the dynamo-field. When the plunger is drawn into the coil owing to the increased armature speed of the dynamo, as has been stated, then said contact-arms $a^5$ and $a^6$ are capable of making contact with the contact-points $a^{12}$ and $a^{13}$ to cause the current to pass through the dynamo-field in the opposite direction, as has been hereinabove stated, and for the purposes to be more fully described hereinafter.

The pole-changer and the other contact making and breaking apparatus are of the usual constructions and are clearly illustrated in Figs. 2 and 3, and the operations of said devices in connection with my present invention will be clearly understood from the following description.

Assuming that the car is about to start, the operator has previously closed a switch C, (see Fig. 2,) causing its arm $c$ to make contact at $c'$ and $c^3$ and also at $c^2$ and $c^4$. This action establishes a complete circuit with one of the batteries J or J', as the case may be, through the make-and-break switch D and the contacts at $a^8$ and $a^9$ by means of the contact-arms $a^5$ and $a^6$ of the regulating device A with the dynamo-field $b$. As both said switches $c'$ $c^3$ and $c^2$ $c^4$ are operated by the same turn by hand with a suitable key on the point $c^5$ of the switch C, the main circuit $b'$ and $b^2$ from the dynamo B is also closed, and the armature B' of the dynamo now rotates in a weak but positive field, due to the slight amount of battery-current passing from the one battery in circuit with the dynamo through the high-resistance winding of the dynamo-field where a weak current is induced in the dynamo-armature, but which, however, is subject to reversal when the armature B' rotates in the opposite direction, according to the forward or backward direction of travel of the car, as will be clearly understood. The current now generated by the dynamo passes through the circuit-wire $b'$ to wire 1 and then through the coil 2 of a shunt-magnet $f$ and back through the wire 3 through an armature-bar $e$, making contact with a contact-point $e'$, and from this point through the wire 4 into the main circuit-wire $b^2$, through the contacts $c^4$ and $c^2$ of the switch C, and thence back through the main circuit-wire $b'$ to the other dynamo-terminal. The current which is now passing through the shunt-magnet $f$ has also energized the armature $f'$ to a certain magnetic polarity corresponding to the direction of the flow of the current through the shunt-coil of the magnet $f$, which has a low resistance, said armature being connected at its upper end by wire 9 in circuit with the wire 10, substantially as shown. The armature $f'$ is in a constant magnetic field H and H′, energized from the coils $f^2$ and $f^3$ in the circuit-wires 6 7 10, switch-contacts $c^3$ $c'$ of the switch C in the battery-circuit, the current of which is constant; but as said armature $f'$ is held in a neutral position between the contacts H and H′ by a pair of springs $h$ and $h'$ (see Fig. 2) it will not be attracted by either contact H or H′ until it has become properly energized to overcome the tension of said springs.

It is self-evident that as contacts H and H′ are constant opposite poles—that is, they never change their polarity—the armature will be repelled by one and attracted by the other of said contacts H and H′, depending upon the direction of the current passing through the coil 2, according to the direction of the rotation of the dynamo-armature, which is subject to reversal according to the direction of the travel of the car. Now, assuming that the armature $f'$ was attracted against the contact H, then said armature $f'$ will complete a circuit through the battery-circuit and the switch D, through the circuit-wires 5 6 7, the shunt-magnet I, the coils of which are I′ and I², wire 8 to the contact H, the armature $f'$, through the wires 9 and 10 to the switch-contacts $c^3$ $c'$ back to the battery. The said shunt-magnet I, being a powerful electromagnetic switch, when thus operated will complete the main exciting shunt-coil circuit K in the field of the dynamo, as will be clearly evident from an inspection of Figs. 1 and 2 of the drawings, whereby the dynamo is allowed to build up as a self-exciting shunt-machine, and its armature speed now rapidly increases on account of the increased speed of the car, and the electromotive force of the dynamo soon becomes equal to and a little higher than the counter electromotive force of the battery. At this time a shunt-coil 13 of the device L becomes energized, the same receiving its current direct through the circuit from L′ of the pole-changer G, wire 12, then through said coil 13, wires 14 15 16, back to the part L² of said pole-changer, the latter being in the main dynamo-circuit $b'$ $b^2$. The current passing through said circuit immediately polarizes an iron bar L³, which attracts the smaller armature N and thus completes the same circuit through the contact L′, wire 16, coils 17 and 18 of the electromagnetic switch N², and the wire 15, connected with the part L² of the pole-changer. In this manner the armature $e$ hereinabove mentioned will be attracted by said switch N² and completes the main dynamo-circuit through the battery J′, as will be evident; but as soon as the armature $e$ is raised it breaks its previously-made contact with the contact-point $e'$, with this result, that a resistance is introduced in series with the coil 2 of the armature $f'$ to protect it from receiving too much current, for the said resistance-coil $o$ was short-circuited through the contact-point $e'$, wire 1, its coil, and wire 19 with the bar $e$ until the latter has become raised and the contact broken at $e'$, which thereupon brings the said resistance-coil $o$ in series with the coil 2, for the purpose already stated.

The hereinabove description of the several circuits and electrical apparatus was upon the assumption that the armature-shaft of the dynamo was caused to rotate in such a direction as to make the brush-terminal $b^3$ in the main circuit $b'$ $b^2$ positive.

The direction of the current in this circuit is as follows: The current, after the switch I is closed, as above stated, passes from the brush-terminal $b^3$ through the wire $b'$, through the closed switch portion $g$ of the pole-changer G, and out through the part L′ thereof, and then through the different translating devices in the manner hereinabove described and back through the part L² into the closed switch portion $g'$ of the pole-changer, and then into the circuit-wire $b^2$ and switch C back to the negative brush-terminal $b^4$ of the dynamo, whereby the main circuit is completed. Now if the armature-shaft of the dynamo is caused to rotate in the opposite direction, due to the reversal of the direction of the car travel, then the poles at the brushes of the dynamo will become changed; but of course it will be absolutely necessary that the current generated should always flow in one and the same direction through the storage battery in order not to destroy the usefulness of the same, and for this reason the pole-changer G hereinabove mentioned has been employed. Assuming, now, that the direction of rotation of the armature of the dynamo has changed, then the brush-terminal $b^4$ becomes the positive pole, and hence the coil 2 will be served with current passing through it in an opposite direction from that hereinabove described, and it therefore polarizes the armature $f'$ with the opposite polar magnetism. Said armature will now be attracted by the contact-point H′ and a complete circuit will be established from the battery, through the wires 5 6 7 20, coils 21 and 22 of the electromagnetic switch P, and wire 23, to the contact H′. Said switch P, which is the mate to the switch I, thus becomes closed, and the dynamo builds up its fields in the same direction as it did before, although the polarity of the dynamo is now reversed. This result is obtained by the generated current first passing through the pole-changer, which straightens out the direction of the current in the well-known manner, so that both batteries, as well as the dynamo-field, will always be fed in one and the same direction. When the voltage at the terminals of the dynamo is high enough, then the electromagnetic switch $N^2$ will again operate in the manner hereinabove described to complete the main circuit between the dynamo and the batteries. The main circuit is now established between the brush-terminal $b^4$, wire $b^2$, switch C, through the closed switch portion $g^2$, and into the part L' of the pole-changer, then through a series coil U and through the series coil $a$ of the regulating device A, mentioned in the beginning of this specification, with the several circuits and apparatus therein, as previously described.

So far, in the description of the several working circuits set forth in connection with both the forward and backward travel of the car, I have omitted to speak of the action of the said regulating device A to maintain a constant electrical output from the dynamo. I will now endeavor to describe its action in connection with the present system of electric train-lighting. The main-circuit current passing through the said coil $a$ of the regulator A then passes through an ammeter A', that may be placed in the circuit, and through circuit-wire 24 to the series winding K' on the field of the dynamo, through the ordinary make-and-break switch $N^3$, and through the circuit-wire 25 into the hand-switch D to the battery J'. The current then passes, to complete the circuit, from said battery into the pole-changer G, through the closed switch portion $g^3$ thereof, and finally into the main circuit-wire $b$ to the now negative brush-terminal $b^3$ of the dynamo. The action of said regulating device A is the same no matter in which direction the armature-shaft of the dynamo rotates. When the train speed becomes slower and the voltage of the dynamo falls to the same level as that of the storage battery or a little lower, then the following occurs: The battery has a tendency in that case to "reverse"—that is, to allow its stored electricity to rush back into the dynamo. This action, however, also reverses the direction of current through the series coil U, which reversal of current will at once polarize the armature N to the opposite magnetic pole, leaving both the armature N and the bar $L^3$ with like poles. The result is that these poles repel each other, and in so doing they open the circuit through the coils 17 and 18 and cause the armature $e$ to release the contact with the electromagnetic make-and-break switch $N^3$ and, therefore, also open the main dynamo-circuit between the dynamo and the storage battery without any deterioration to the latter.

The constructions of the switch D and the two batteries J and J' are similar to those described in my two former patents, No. 525,992, of September 11, 1894, and No. 542,771, of July 16, 1895, and, therefore, need not be further described here. Suffice it to say, however, that while the battery J' is being charged the other battery J is used for feeding the lights R in the lamp-circuit, and when the battery J is exhausted then the switch D is turned by hand in the manner set forth in my previous patent, which immediately places the other battery J' in the lamp-circuit and the battery J in the dynamo-circuit for recharging. In connection with the lamp-circuit I have illustrated the use of an ordinary switch $r$ for closing off this circuit when the lights are not required, but while the battery is still being charged, and $r'$ indicates a small resistance-coil to be used in connection with the lamp-circuit.

By means of my present invention I have succeeded in producing an operative and complete system of wiring from the dynamo through the car comprising improved and more simplified mechanism over that set forth in my previous patent, No. 542,771, for controlling and maintaining the equalization of the electromotive force of the dynamo by increasing or decreasing its magnetic field to make up for the increase or decrease of the armature speed; also, a pole-changer for taking care of the reversal of the direction of rotation of the armature-shaft, and an arrangement of a working or main circuit in which I have arranged lamps or other translating devices fed from independently-operating storage batteries.

Of course it will be clearly evident that changes may be made in the various details and arrangements and combinations of the circuits and the electrical devices without departing from the scope of my invention. Hence I do not limit my invention to the exact arrangements and combinations of the several parts herein described and illustrated in the accompanying drawings. It will also be understood that my invention is applicable not only to the generation of electricity from the car-wheel axle, but it is also of use where the dynamo is driven from other sources of variable speed or where the armature is subject to reversal.

Having thus described my invention, what I claim is—

1. The combination, with a working or main circuit containing lamps or other electrical translating devices, of a dynamo in said circuit, wound with a main exciting shunt-coil around the field thereof, a series coil wound in the opposite direction around the field of said dynamo, a high-resistance shunt-coil fed from the dynamo, and an automatic regulating device A, comprising a series coil and a make-and-break device connected therewith, for regulating the flow of the electricity through the coils on the field of the dynamo, substantially as and for the purposes set forth.

2. The combination, with a working or main circuit containing lamps or other electrical translating devices, of a dynamo in said circuit, wound with a main exciting shunt-coil around the field thereof, a series coil wound in the opposite direction around the field of the dynamo, a high-resistance shunt-coil fed from the dynamo, and an automatic regulating device A, comprising a series coil and a make-and-break device connected therewith, for regulating the flow of the electricity through the coils on the field of the dynamo, and a pole-changer in the main dynamo-circuit, substantially as and for the purposes set forth.

3. The combination, with a dynamo having its armature in circuit with a high-resistance shunt-coil which tends to cut down the field magnetism, of a reversible driving power, and a pole-changer responsive to the reversal of said power, a main circuit connected with said dynamo and wound around the field thereof, and coacting with said high-resistance coil, and an automatic regulating device A, comprising a series coil and a make-and-break device connected therewith, for regulating the flow of electricity through the coils on the field of the dynamo, substantially as and for the purposes set forth.

4. The combination, with a dynamo having its armature in circuit with a high-resistance shunt-coil which tends to cut down the field magnetism, of a reversible driving power, and a pole-changer responsive to the reversal of said power, a main circuit connected with said dynamo and wound around the field thereof, and coacting with said high-resistance coil, and an automatic regulating device A, comprising a series coil and a make-and-break device connected therewith, for regulating the flow of electricity through the coils on the field of the dynamo, consisting, essentially, of a plunger $a'$, connected with a pair of pivoted arms $a^2$ and $a^3$, normally acting against a tension-spring, and contact-arms $a^5$ and $a^6$ connected with said plunger, and movable against certain contacts connected in circuit with a coil on the dynamo-field, substantially as and for the purposes set forth.

5. The combination, with a dynamo mounted on a car-truck and driven from the car-wheel axle, said dynamo having its armature in circuit with a high-resistance shunt-coil which tends to cut down the field magnetism, a main circuit connected with said dynamo and wound around the field thereof, and coacting with said high-resistance coil, and an automatic regulating device A, comprising a series coil and a make-and-break device connected therewith, for regulating the flow of electricity through the coils on the field of the dynamo, substantially as and for the purposes set forth.

6. The combination, with a dynamo mounted on a car-truck and driven from the car-wheel axle, said dynamo having its armature in circuit with a high-resistance shunt-coil which tends to cut down the field magnetism, a main circuit connected with said dynamo and wound around the field thereof, and coacting with said high-resistance coil, and an automatic regulating device A, comprising a series coil and a make-and-break device connected therewith, for regulating the flow of electricity through the coils on the field of the dynamo, consisting, essentially, of a plunger $a'$, connected with a pair of pivoted arms $a^2$ and $a^3$, normally acting against a tension-spring, and contact-arms $a^5$ and $a^6$ connected with said plunger, and movable against certain contacts connected in circuit with a coil on the dynamo-field, substantially as and for the purposes set forth.

7. A dynamo-electric machine, subject to variable armature speed, having a self-excited field-coil in shunt with its armature, an opposing high-resistance coil, a series coil wound in the opposite direction around the field of said dynamo, and an automatic regulating device A, comprising a series coil and a make-and-break device connected therewith, for regulating the flow of electricity through the coils on the field of the dynamo, substantially as and for the purposes set forth.

8. A dynamo-electric machine, subject to variable armature speed, having a self-excited field-coil in shunt with its armature, an opposing high-resistance coil, a series coil wound in the opposite direction around the field of said dynamo, and an automatic regulating device A, comprising a series coil and a make-and-break device connected therewith, for regulating the flow of electricity through the coils on the field of the dynamo, consisting, essentially, of a plunger $a'$, connected with a pair of pivoted arms $a^2$ and $a^3$, normally acting against a tension-spring, and contact-arms $a^5$ and $a^6$ connected with said plunger, and movable against certain contacts connected in circuit with a coil on the dynamo-field, substantially as and for the purposes set forth.

9. The combination, with a working and a lamp circuit, containing lamps or other translating devices, and a battery, of a dynamo operated under varying speeds and subject to armature reversal, a pole-changer, and an automatic electric regulator A adapted to regulate the flow of electricity through the dynamo, said dynamo being excited from said battery at a slow speed, and said dynamo, at a fast speed, having its field self-excited and regulated by said regulator A, substantially as and for the purposes set forth.

10. The combination, with a working and a lamp circuit, containing lamps or other translating devices, of a pair of storage batteries, a dynamo operated under varying speeds and subject to armature reversal, a switch connecting one of said batteries directly in circuit with the dynamo, and the other of said batteries in circuit with the lamp-circuit, a a pole-changer in said main dynamo-circuit, and an automatic regulator A adapted to regulate the flow of electricity through the dynamo, said dynamo being excited from the battery in circuit with the dynamo, at a slow speed, and at a high speed, said dynamo having its field self-excited and regulated by said regulator A, substantially as and for the purposes set forth.

11. The combination, with a working and a lamp circuit, containing lamps or other translating devices, of a pair of storage batteries, a dynamo operated under varying speeds and subject to armature reversal, a switch connecting one of said batteries directly in circuit with the dynamo, and the other of said batteries in circuit with the lamp-circuit, a pole-changer in said main dynamo-circuit, and an automatic regulator A adapted to regulate the flow of electricity through the dynamo, consisting, essentially, of a plunger $a'$, connected with a pair of pivoted arms $a^2$ and $a^3$, normally acting against a tension-spring, and contact-arms $a^5$ and $a^6$ connected with said plunger, and movable against certain contacts connected in circuit with a coil on the field of the dynamo, substantially as and for the purposes set forth.

In testimony that I claim the invention set forth above I have hereunto set my hand this 12th day of May, 1897.

MORRIS MOSKOWITZ.

Witnesses:
 FREDK. C. FRAENTZEL,
 WM. H. CAMFIELD, Jr.